United States Patent [19]
Tabib-Azar

[11] Patent Number: 6,069,419
[45] Date of Patent: May 30, 2000

[54] MICRO-ACTUATOR ASSEMBLY

[76] Inventor: Massood Tabib-Azar, 2762 Berkshire Rd., Cleveland Hts., Ohio 44106-3363

[21] Appl. No.: 09/097,384

[22] Filed: Jun. 16, 1998

[51] Int. Cl.$^7$ .............................. H02K 7/00; H02K 7/06
[52] U.S. Cl. ...................................... 310/40 MM; 310/20
[58] Field of Search .................... 310/15, 20, 21, 310/323.01, 323.02, 328, 40 MM; 74/133, 134, 135, 141.5, 142, 159, 167

[56] References Cited

U.S. PATENT DOCUMENTS

| | | | |
|---|---|---|---|
| 1,600,088 | 9/1926 | Burstyn | 74/144 |
| 1,601,247 | 9/1926 | Garbarini | 310/20 |
| 1,966,315 | 7/1934 | Siliceo | 310/21 |
| 3,946,459 | 3/1976 | Armstrong | 15/377 |
| 4,422,001 | 12/1983 | Weiss | 310/328 |
| 4,453,103 | 6/1984 | Vishnevsky et al. | 310/323 |
| 4,528,468 | 7/1985 | Leubecker | 310/21 |
| 4,782,262 | 11/1988 | Kiyo-Oka | 310/323 |
| 5,068,565 | 11/1991 | Huang | 310/328 |
| 5,296,776 | 3/1994 | Wind et al. | 310/323 |
| 5,770,913 | 6/1998 | Mizzi | 310/328 |

*Primary Examiner*—Clayton LaBalle
*Attorney, Agent, or Firm*—Fleshner & Kim, LLP

[57] ABSTRACT

A micro-actuator includes a movable member having fins that are elastically mounted thereto, and a reciprocating actuator. In rotational micro-actuators embodying the invention, the fins are attached to a peripheral surface of a rotor, and the actuator moves to compress the fins toward the peripheral surface of the rotor. This imparts a rotational force which rotates the rotor. In linear micro-actuators, fins can be attached to a movable member which is arranged to move along a track. Actuators positioned along the track can cause the fins on the movable member to compress, thereby moving the movable member along the track. In alternate linear micro-actuators, the actuators can be located on the movable member, and the fins can be located on the track. Rotational and linear micro-actuators embodying the invention could also be configured to operate in opposing directions.

41 Claims, 7 Drawing Sheets

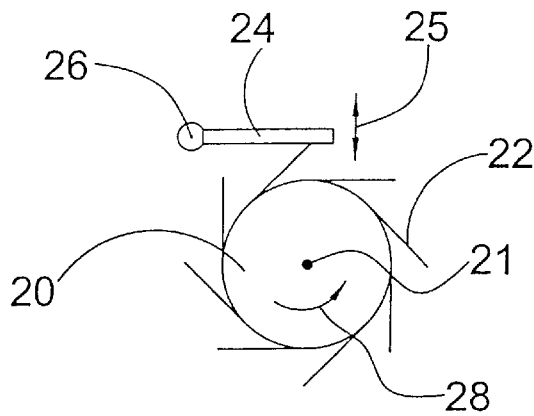
FIG. 1
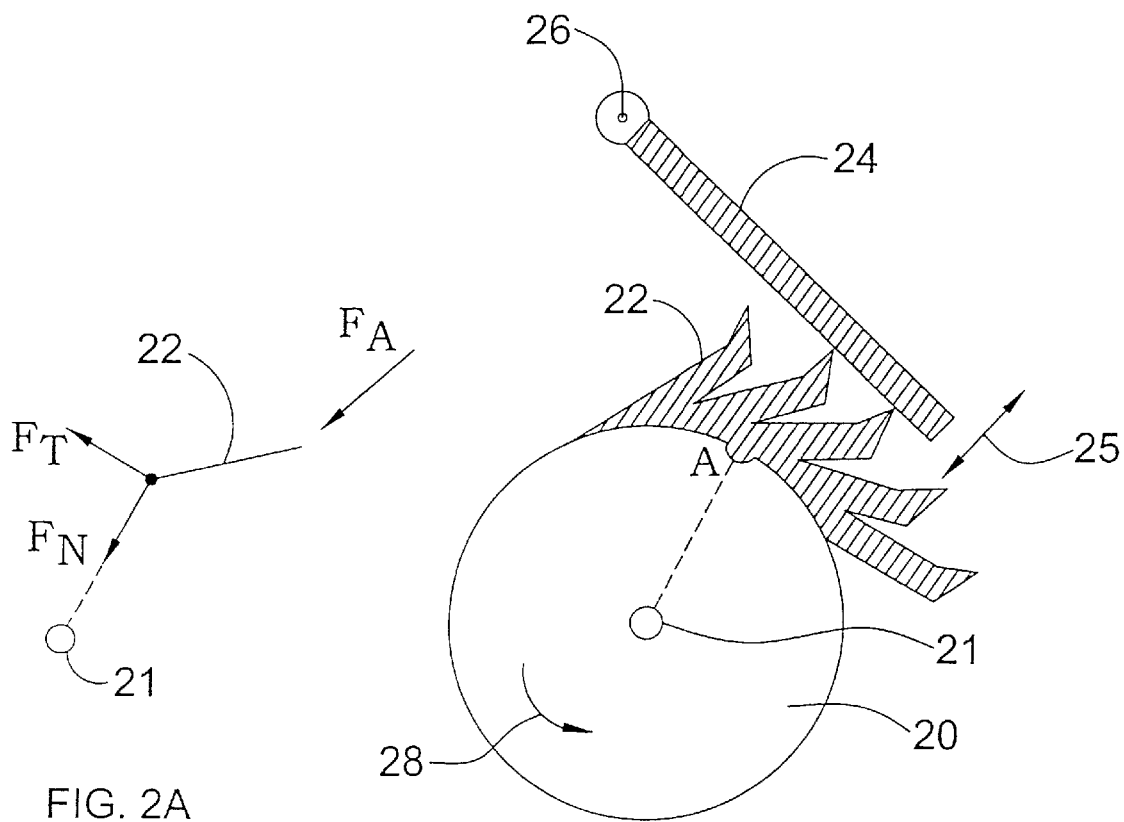
FIG. 2A
FIG. 2B

MICRO-ACTUATOR ASSEMBLY

BACKGROUND OF THE INVENTION

1. Field of the Invention

The invention relates to scalable micro-actuators that can be used to produce rotational or linear movements.

2. Background of the Related Art

Many different micro-actuators have been created for a variety of different purposes. Some of the micro-actuators can be formed on a silicon substrate using photolithographic or micromachining techniques. Such micro-actuators can produce rotational or linear movements to induce a displacement, or to exert a force.

Known micro-actuator structures include an electrostatic Curie wheel, a variable-capacitance electrostatic motor, an electrostatic wobble micro-motor and a static induction motor. Each of these micro-actuators provide rotational movement. Also, comb-drives can be used to provide a linear reciprocal movement. Various types of ultrasonic motors have also been designed and built.

In each of these prior art devices, the available torque is typically a range of pico-nano N-M for a rotor having a diameter of between 100 and 200 μm. Also, many of the known micro-actuator structures cannot be easily scaled to different sizes, and they cannot be easily assembled using micromachining techniques.

SUMMARY OF THE INVENTION

The invention is a new micro-actuator architecture that can be used to provide rotational and linear movement. Micro-actuators created according to the present invention can be easily fabricated using standard micromachining techniques, or photolithographic techniques. Micro-actuators embodying the invention can provide significantly greater amounts of torque or force than other known micro-actuator structures.

A rotational embodiment of the present invention includes a rotor having a plurality of fins that extend out from a peripheral edge of the rotor at an angle. The fins are elastically attached to the peripheral edge of the rotor such that they can be bent towards the rotor. An actuator is located adjacent the peripheral edge of the rotor, and the actuator is constructed to provide reciprocal movement toward and away from the rotor. The reciprocal movement of the actuator causes the actuator to contact ends of the fins, and to bend the fins inward towards the peripheral edge of the rotor. The contact between the actuator and the fins imparts a rotational force to the rotor which causes the rotor to rotate. Continued reciprocal movements of the actuator cause the actuator to contact each of the fins, in sequence, and causes the rotor to maintain a rotational movement.

In alternate rotational embodiments of the invention, a first set of fins can be attached to the peripheral edge of the rotor at a first orientation, and a second set of fins can be attached to the rotor in a second orientation. When an actuator contacts the first set of fins, the rotor will rotate in a first direction. When an actuator contacts the second set of fins, the rotor will rotate in a second, opposite direction. Such an embodiment could include two actuators, a first actuator arranged to contact the first set of fins and the second actuator arranged to contact the second set of fins.

In linear embodiments of the present invention, a movable member having a plurality of fins can be arranged to move along a track. One or more actuators located on the sides of the track can be arranged for reciprocal movement toward and away from the movable member. The reciprocal movement of the actuator will cause the actuator to contact individual fins on the movable member and to move the fins inward, toward the movable member. The contact between the actuator and the fins will cause the movable member to move along the track.

In an alternate linear embodiment, a first set of fins could be arranged on the movable member in a first orientation, and a second set of fins could be arranged in a second orientation. Contacting the first set of fins with an actuator could cause the moveable member to move in a first direction, whereas contact with the second set of fins would cause the movable member to move in a second direction.

In still other linear embodiments, one or more actuators could be attached to the movable member, and one or more sets of fins could be located on the track. Reciprocal movement of the actuators away from the movable member would cause the actuators to contact the fins and to move the movable member along the track. In this type of embodiment, the track could include a first set of fins oriented in a first direction and a second set of fins oriented in a second direction. By selectively contact the first or second set of fins, an actuator could cause the movable member to move in different directions.

Additional advantages, objects, and features of the invention will be set forth in description which follows, and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 1 is a diagram of a rotational micro-actuator embodying the invention;

FIGS. 2A and 2B illustrate operational principles of a rotational micro-actuator embodying the invention;

DETAILED DESCRIPTION OF PREFERRED EMBODIMENTS

Figure 3:
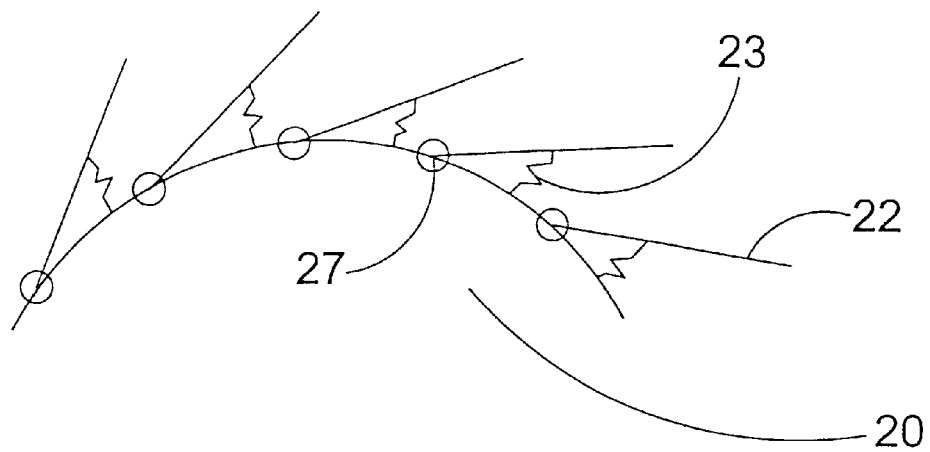
FIG. 3 illustrates a method of attaching fins to a rotor of a micro-actuator embodying the invention.

In the following description, the terms "micro-actuator," "micro-motor" and "motor" are used interchangeably to refer to a micro-actuator embodying the invention.

A diagram of a rotational micro-motor embodying the invention is shown in FIG. 1. This embodiment includes a rotor 20 that rotates about an axis of rotation 21. A plurality of fins 22 are elastically mounted to an exterior peripheral surface of the rotor 20. The fins 22 are capable of bending such that the exterior tip of a fin moves inward towards the peripheral surface of the rotor 20.

An actuator 24 is located adjacent the peripheral surface of the rotor 20. The actuator 24 is capable of reciprocal movement in the directions of the arrows 25. The actuator could be configured to move in a linear direction toward and away from the peripheral surface of the rotor 20, or the actuator 24 could pivot about a pivot point 26, or combinations of these motions are possible.

As the actuator 24 moves toward a peripheral surface of the rotor 20, a surface of the actuator 24 contacts an exterior tip of a fin 22. As the actuator 24 continues to move towards the peripheral surface of the rotor 20, the fin 22 is bent inward towards the peripheral surface. Ideally, friction between the tip of the fin 22 and the surface of the actuator 24 is such that the tip of the fin 22 does not move or slide against the actuator 24.

The contact between the actuator 24 and the fin 22 imparts a force to the fin 22 which tends to rotate the rotor 20 in the direction of arrow 28. When the actuator reverses direction and moves away from the peripheral surface of the rotor 20, the actuator releases the fin that was contacted, and the rotor rotates in the direction of arrow 28. This causes the next fin 22 to be positioned between the peripheral surface of the rotor 20 and the actuator 24. The actuator 24 then moves inward again and contacts the next fin to impart an additional rotational force to the rotor 20. Continued reciprocal movements of the actuator 24 will cause the rotor 20 to continuously rotate.

FIGS. 2A and 2B are diagrams that help to explain how the reciprocal movement of an actuator 24 imparts a rotational force to a rotor 20. As shown in FIG. 2B, an actuator 24 moves in a reciprocal direction as indicated by the arrows 25. Movement of the actuator 24 towards a peripheral surface of the rotor 20 causes the actuator to contact one or more fins 22. Contact between the actuator 24 and the fins 22 causes a force to be transferred from the actuator to the fins.

As seen in FIG. 2A, a force $F_A$ represents the force imparted to a fin 22 by the actuator 24. The force $F_A$ can be resolved into two forces $F_T$ and $F_N$. The force $F_N$ is directed towards the rotational axis 21 of the rotor 20, normal to the peripheral surface of the rotor. The force $F_N$ may be resisted by a bearing or a rotational shaft of the rotor 20. In alternate embodiments, which are described below, the force $F_N$ may be canceled by a corresponding force $F_N$ applied to the rotor by a second actuator located on an opposite side of the rotor. The force $F_A$ also causes a force $F_T$ to be imparted to a peripheral surface of the rotor 20. The force $F_T$ is directed in a direction which is tangent to the peripheral surface of the rotor 20. The force $F_T$ tends to rotate the rotor 20 in the direction of arrow 28.

Figure 4:
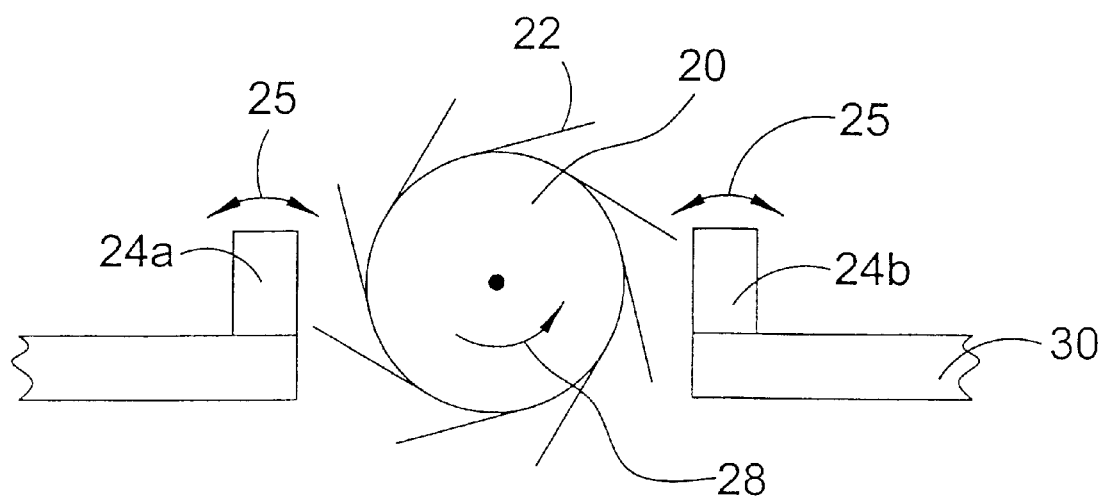
FIG. 4 is a diagram showing a rotational micro-actuator embodying the invention having two actuators.

A two actuator version of a rotational micro-motor embodying the invention is shown in FIG. 4. In this embodiment, the two actuators 24a, 24b are located on housing 30 on opposite sides of a rotor 20. The actuators 24a, 24b move in reciprocal fashion in the directions of arrows 25. The actuators 24a, 24b contact fins 22 elastically attached to a peripheral surface of the rotor 20. Movement of the actuators 24a, 24b inward, toward the rotor 20, causes the fins 22 to be compressed toward the peripheral surface of the rotor 20. The contact between the actuators and the fins imparts tangential forces to the rotor 20 that cause the rotor 20 to rotate in the direction of arrow 28.

In the embodiment shown in FIG. 4, if the device is configured such that the actuators 24a, 24b move inward towards the rotor simultaneously, any force imparted to the rotor 20 in a direction normal to the peripheral surface will tend to cancel one another out, and only the tangential forces which tend to rotate the rotor 20 will be imparted to the rotor 20. In alternate embodiments, the actuators 24a, 24b may be configured to move towards the rotor at different times to achieve a desired rotational effect. For instance, by operating only the actuator 24a on the left of the rotor 20, one could obtain a particular rotational speed and a particular torque. By operating both actuators 24a and 24b, it may be possible to obtain a different rotational speed, or a greater amount of torque.

The amount of torque that can be developed by a rotational micro-motor embodying the invention, as shown in FIGS. 1 and 4, is heavily dependent on the frictional force between the actuators and the fins. The greater the frictional force, the greater the torque that can be developed by the device. Ideally, the frictional force between an actuator 24 and corresponding fins 22 should be sufficient to prevent the fin from sliding against an actuator. In some embodiments of the invention, an electrostatic coupling force may be used to obtain a greater normal force between the fins 22 and the actuators 24, thus providing a greater frictional force, and a higher potential torque.

In addition, the amount of rotational force that is imparted to a rotor 20 is dependent upon the geometry of an embodiment. The angle at which the fins 22 extend from the rotor 20, the angle formed between a fin 22 and a corresponding surface of an actuator 24, and the geometry of a tip of a fin 22 all have an effect on the tangential and normal forces that are imparted to a rotor 20 by an actuator 24. The angles can be selectively varied to achieve a particular desired result. Also, many different fin tip configurations are possible that can help to maximize the frictional force developed between an actuator and the corresponding fins.

Furthermore, the rotational speed at which a rotor 20 of such a device will rotate is dependent upon the geometry of the device, and the oscillation speed of the actuators 24. Since many of the actuators contemplated for use in the present invention are intended to oscillate at a resonant frequency, particular embodiments of the invention may tend to rotate at discreet rotational speeds corresponding to the resonant oscillation frequencies of the actuators. It may be possible to cause the actuators to oscillate at non-resonant frequencies, however, this will usually require significantly more input power to achieve steady state oscillation than is required for oscillation at a resonant frequency. The micro-motor will be most efficient when the actuators are operated at a resonant frequency.

The resonant frequency of a particular actuator, however, can be varied depending upon the fabrication techniques and the dimensions of the actuator. Thus, it is possible to construct a micro-motor embodying the invention such that it rotates at a predetermined rotational speed by controlling fabrication of the actuators.

Figure 5A:
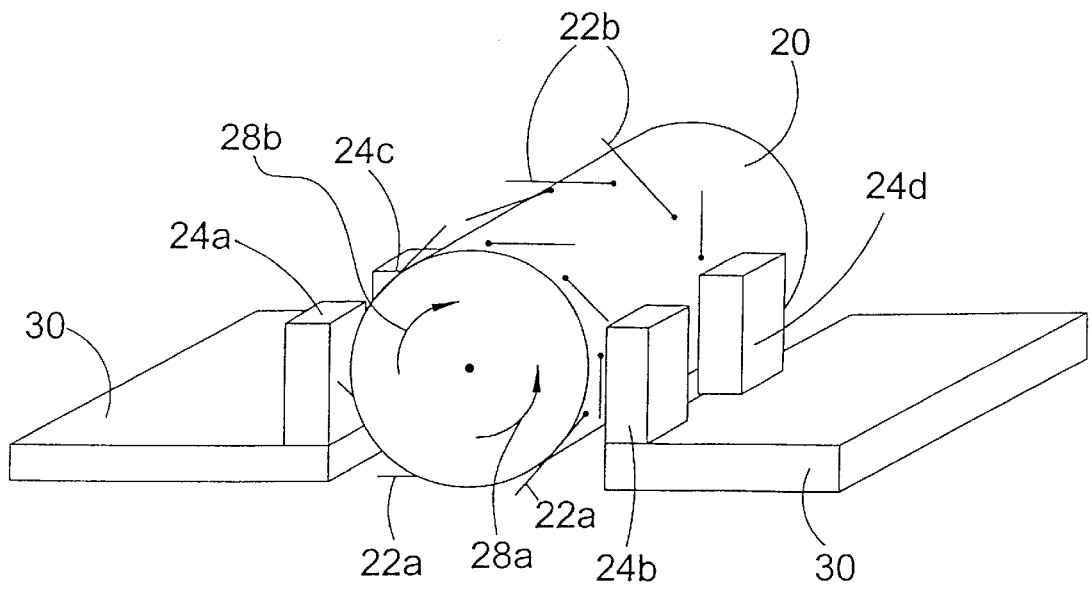
FIGS. 5A and 5B are perspective diagrams illustrating two direction rotational micro-actuators embodying the invention.
Figure 5B:
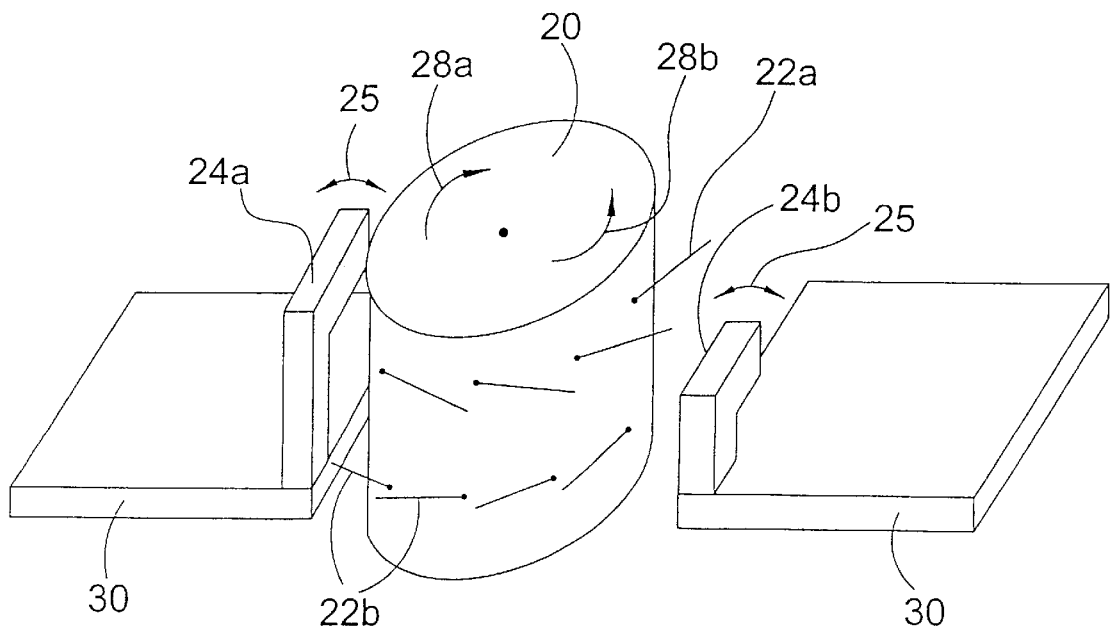

Two directional rotational micro-motors embodying the invention are shown in FIGS. 5A and 5B. In these embodiments, there are two sets of fins 22 extending from a rotor 20. A first set of fins 22a are arranged on the rotor 20 so they extend in a first angular orientation. The second set of fins 22b are arranged on the rotor to extend in a different angular orientation.

In the embodiment shown in FIG. 5A, two opposing actuators 24a, 24b are located on housing 30 on opposite sides of the rotor such that they may contact the first set of fins 22a. Third and fourth actuators 24c, 24d are located on opposite sides of the rotor 20 so that they may contact the second set of fins 22b. In alternate two direction rotational micro-motors embodying the invention, only a single actuator may be paired with each set of fins. Alternatively, more than two actuators could be arranged around the rotor 20 to contact one of the sets of fins.

When the first and second actuators 24a, 24b are operated, the rotor 20 will tend to rotate in the direction of arrow 28a. When the third and fourth actuators 24c, 24d are operated, the rotor 20 will tend to rotate in the direction of arrow 28b. Thus, by controlling the actuators that are operated, one can control the rotational direction of the rotor 20.

In the embodiment shown in FIG. 5B, a single actuator is located next to each of the two sets of fins 22a, 22b. The first actuator 24a is positioned higher than the second actuator 24b, so that the actuators act on different sets of fins. The first actuator 24a acts against the first set of fins 22a to cause the rotor 20 to rotate in the direction of arrow 28a. The second actuator 24b acts against the second set of fins 22b to cause the rotor to rotate in the direction of arrow 28b.

Figure 6:
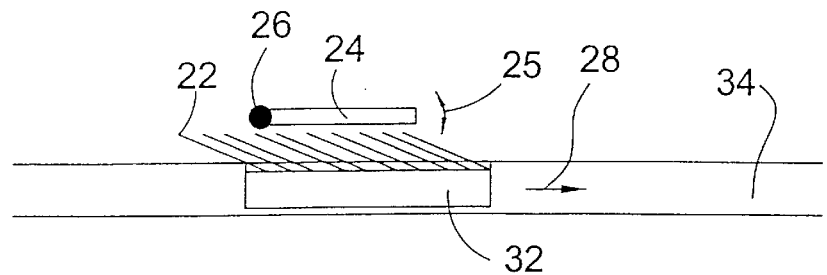
FIG. 6 is a diagram illustrating a linear micro-actuator embodying the invention.

FIG. 6 is a diagram showing a linear micro-actuator embodying the invention. In this embodiment, a movable member 32 is arranged on a track 34. Fins 22 extend from the movable member 32 at an angle. An actuator 24 is positioned adjacent the movable member such that reciprocal movement of the actuator 24 in the direction of arrows 25 brings the actuator 24 into contact with the fins 22.

When the actuator 24 moves toward the movable member 32, a surface of the actuator 24 will contact one or more fins 22 and cause the fins to be compressed toward the movable member 32. The contact between the actuator and the fins will impart a force to the movable member 32 which will have both a normal component and a tangential component. The tangential component of the force will cause the movable member 32 to move along the track 34 in the direction of arrow 28.

Figure 7:
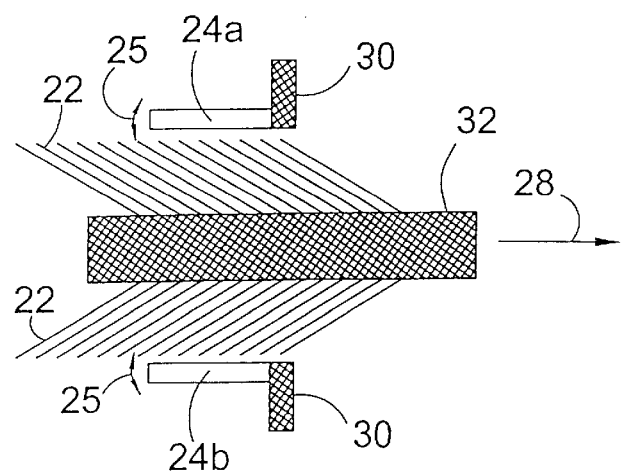
FIG. 7 is a diagram illustrating a linear micro-actuator embodying the invention having two actuators.

Another linear micro-actuator embodying the invention is shown in FIG. 7. In this embodiment, fins 22 are formed on opposite sides of a movable member 32. Actuators 24a, 24b are located on opposite sides of the movable member 32. The actuators 24a, 24b are designed to move in a reciprocal fashion in the direction of arrows 25. This embodiment is configured such that when one or both of the actuators 24a, 24b move towards the movable member 32, the fins 22 are compressed and the movable member 32 will tend to move in the direction of arrow 28. As with the rotational micromotor shown in FIG. 4, the addition of a second actuator can be used to increase the force that tends to move the movable member, or to vary a speed of the movable member 32.

Figure 8:
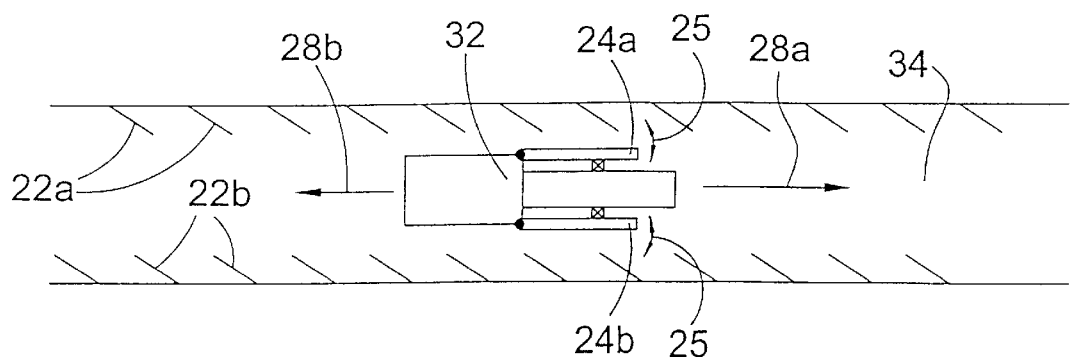
FIG. 8 is a diagram illustrating a linear micro-actuator embodying the invention having fins oriented in two directions, and having actuators attached to a movable member.

Yet another linear micro-actuator embodying the invention is shown in FIG. 8. In this embodiment, a movable member 32 includes actuators 24a and 24b mounted on opposite sides of the movable member 32. The actuators 24a, 24b are designed to move in a reciprocal fashion in the direction of arrows 25. The movable member 32 is arranged on a track 34 which has fins 22a, 22b mounted thereon. A first set of fins 22a are oriented in a first angular direction on the track, and a second set of fins 22b are oriented in a different angular direction.

In this embodiment, operation of the first actuator 24a will cause the actuator to move outward away from the movable member so that the actuator 24a contacts one or more of the first set of fins 22a. This will cause the first set of fins 22a to compress against the track and to tend to move the movable member in the direction of arrow 28a. Operation of the second actuator 24b will cause the actuator 24b to move outward away from the movable member towards the second set of fins 22b. When the second actuator 24b contacts and compresses one or more of the second set of fins 22b, the movable member 32 will tend to move in the direction of arrow 28b. Thus, this embodiment can be used to provide bi-directional movement of a movable member 32.

Of course, the embodiment shown in FIG. 7 could also have the fins on one side of the movable member oriented in a first direction, and the fins on the opposite side of the movable member oriented in a different direction. This would allow the movable member to be propelled in different directions, depending on the actuator that is operated.

In preferred embodiments of the invention that utilize the basic architectures shown in FIGS. 1 and 4–8, the rotor, movable member or track and the fins 22 may be integrally formed in a silicon substrate using photolithographic or micromachining techniques. The fins 22 would simply be extensions of the rotor, movable member or track. In an embodiment like the one shown in FIG. 8, the fins could be integrally formed with the track.

The fins can have a variety of different cross-sectional shapes, depending on the desired configuration of the device. The fins could have a circular, oval, rectangular or polygonal cross-section, or any other shape that is necessary for a particular embodiment.

The actuator can take a variety of forms including piezoelectric devices, electrostatic devices or shape memory devices. Of course, any other type of actuator capable of moving in a reciprocal fashion could also be used. Preferred embodiments of the invention would utilize piezoelectric devices, which can also be fabricated on a silicon substrate using photolithographic or micromachining techniques. Preferably, the actuator 24, the rotor or movable member, the track, and any fins 22 would all be fabricated on a single silicon substrate. Because of the flexibility of the basic architecture, a micro-actuator embodying the invention can be scaled to an infinite variety of different sizes.

Piezoelectric devices that could be used as the actuator in embodiments of the invention typically generate mechanical oscillations in the range of 200–200,000 Hz, with moderate amplitudes and large forces. Shape memory devices that could be used typically generate oscillations of between 1–1,000 Hz, with large amplitudes and forces.

In alternate embodiments of the invention, the fins 22 could be attached to a rotor, movable member or a track as shown in FIG. 3. In this embodiment, the fins 22, which are formed separately from the rotor, movable member or track are pivotally attached at a pivot point 27. In addition, biasing devices 23 can be attached to bias the fins 22 away from a peripheral surface of the rotor, movable member or track. The biasing device 23 could comprise any type of coil or leaf spring device or any other type of biasing device known in the art. In this type of an arrangement, the fins 22 could be substantially rigid.

If a rotor, movable member or track is formed on a silicon substrate using photolithographic or micromachining techniques, the rotor, movable member or track and the fins could be integrally formed of a single piece of silicon. However, biasing members could also formed from the silicon substrate, the biasing members being located between the rotor, movable member or track and an intermediate portion of a fin.

Figure 9:
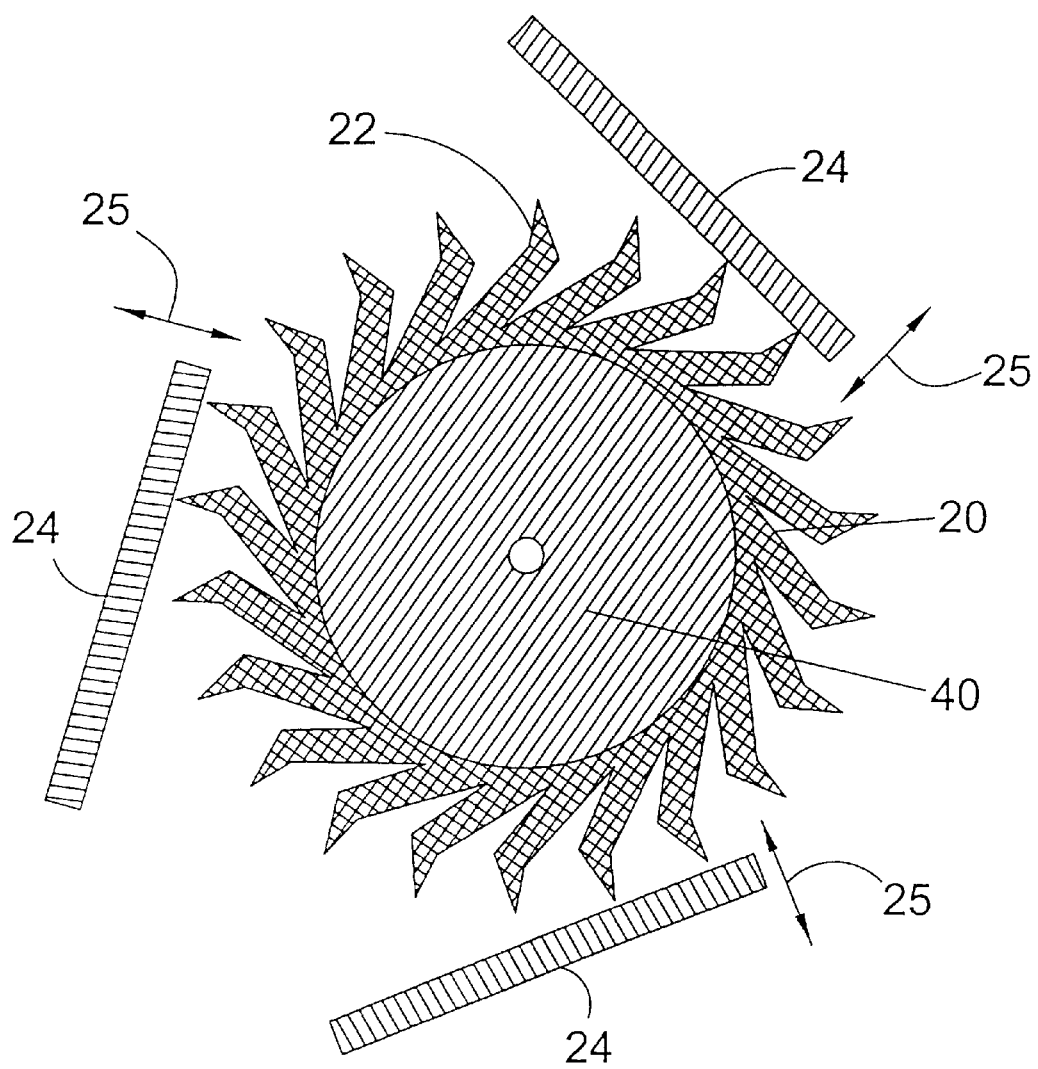
FIG. 9 is a diagram of a rotational micro-actuator embodying the invention having multiple actuators.

FIG. 9 illustrates a rotational micro-motor embodying the invention that includes three actuators 24. Each of the actuators 24 is capable of reciprocal movement in the direction of arrows 25. More than three actuators could be oriented around the periphery of the rotor 20. The addition of more than one actuator 24 can increase the amount of torque, or the speed developed by the rotor 20.

If the embodiment shown in FIG. 9 includes a diffraction grating 40 mounted on the rotor 20, the device could be used to scan a laser beam for a variety of applications such as laser printers, copiers, laser bar code scanners, data storage and retrieval applications and other optical scanning applications.

Figure 10:
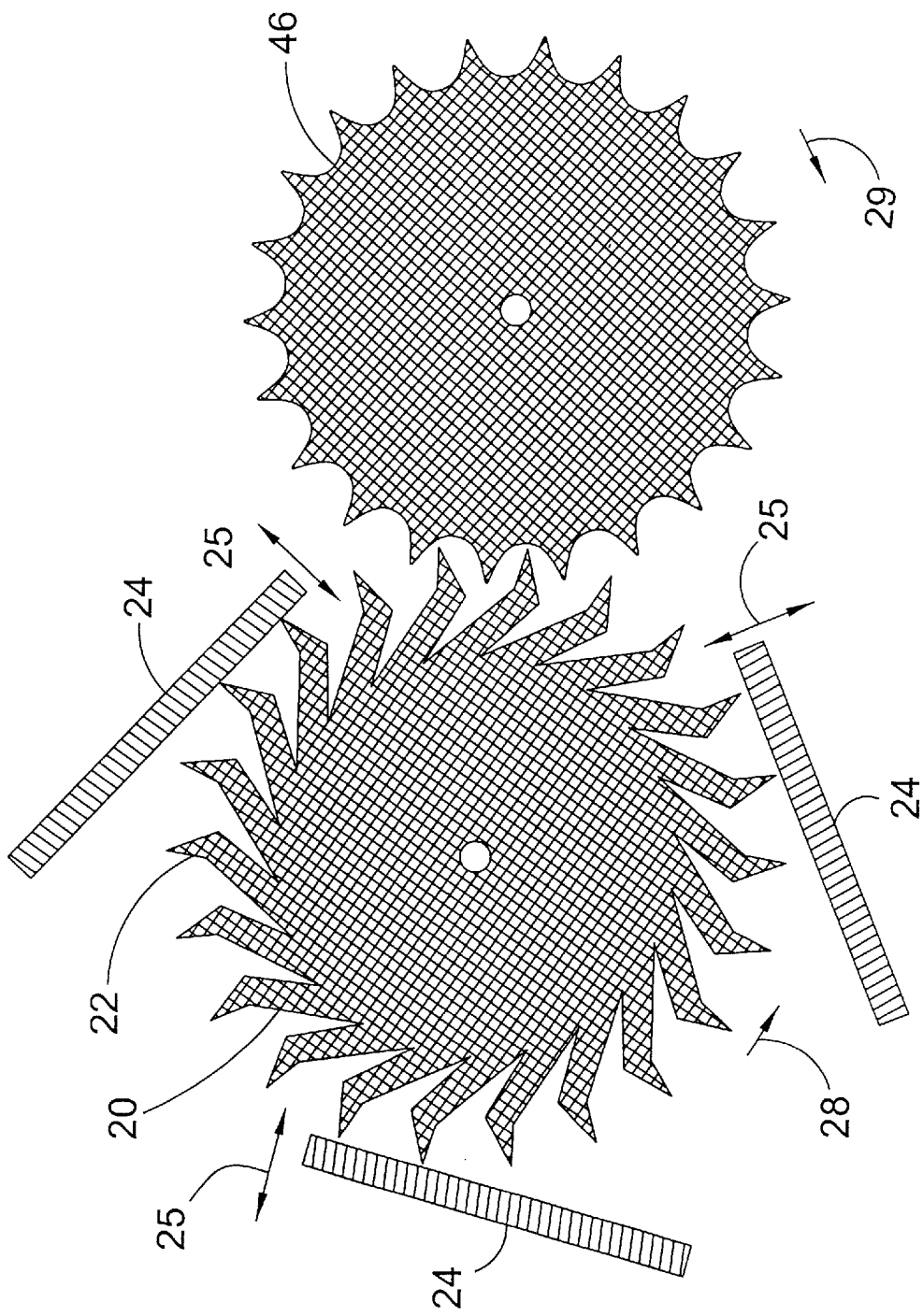
FIG. 10 is a diagram illustrating a rotational micro-actuator embodying the invention used to rotate a gear.

FIG. 10 shows a rotational micro-motor embodying the invention used to drive a gear 46. The fins 22 of the rotor 20 rotate with the rotor in the direction of arrow 28. The movement of the fins 22 can be used to drive teeth of a gear 46 to cause the gear 46 to rotate in the direction of arrow 29.

Figure 11:
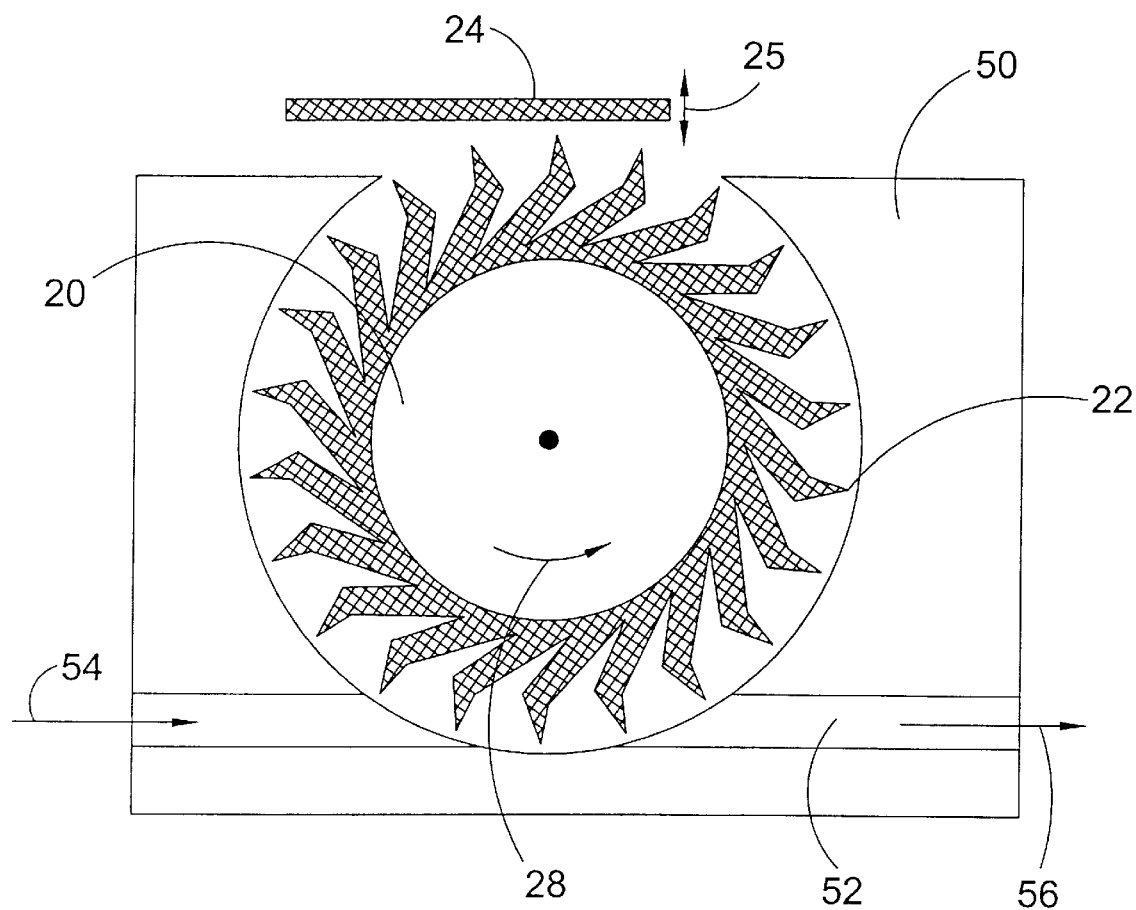
FIG. 11 shows a rotational micro-actuator embodying the invention used in a pump apparatus.

FIG. 11 shows a rotational micro-motor embodying the invention used in a pump apparatus. In this embodiment, a rotor 20 rotates in the direction of arrow 28 in response to reciprocal movements of an actuator 24 in the directions of the arrows 25. The rotor 20 is mounted in a housing 50 which includes a passage 52. The rotational movement of the fins 22 can cause a fluid to be forced along the passage 52 in the direction of arrows 54, 56.

Because no electrostatic excitation is used in the rotor 20, this type of a micro pump would be ideal for pumping ionic fluids, flammable gasses and liquids, and nonpolar substances. It could also be used to generate a vacuum. Because a micro-motor like the one shown in FIG. 11 can be made to extremely small dimensions, the pump apparatus could be used for a variety of microscopic pump applications.

The foregoing embodiments are merely exemplary and are not to be construed as limiting the present invention. Many alternatives, modifications, and variations will be apparent to those skilled in the art. In the claims, means-plus-function clauses are intended to cover the structures described herein as performing the recited function and not only structural equivalents but also equivalent structures. For example, a fin having a circular cross-section and a fin having a rectangular cross-section may not be structural equivalents in that they will have different dimensions and strength characteristics, however, in the environment of acting as fins of a micro-actuator, circular and rectangular cross-sectional fins may be equivalent structures.

What is claimed is:

1. A micro-actuator, comprising:
    a housing;
    a rotor that is rotationally attached to the housing;
    a plurality of fins, wherein inner portions of the plurality of fins are attached to a peripheral edge of the rotor; and
    an actuator arranged on the housing adjacent to a surface of the rotor and extending parallel to a tangent of the rotor, the actuator being adapted for reciprocal movement in a direction substantially perpendicular to the tangent, wherein the reciprocal movement of the actuator brings the actuator into contact with at least one of the plurality of fins, and wherein said reciprocal movement causes the rotor to rotate.

2. The micro-actuator of claim 1, wherein the plurality of fins are elastically attached to the rotor, and wherein the reciprocal movement of the actuator causes fins which the actuator contacts to move with respect to the rotor.

3. The micro-actuator of claim 1, wherein the actuator contacts outer portions of the plurality of fins.

4. The micro-actuator of claim 1, wherein the plurality of fins are pivotally attached to the peripheral edge of the rotor.

5. The micro-actuator of claim 4, further comprising a plurality of biasing members, wherein each biasing member acts on a corresponding fin such that outer portions of the fins are biased away from the peripheral edge of the rotor.

6. The micro-actuator of claim 1, further comprising at least one additional actuator, wherein the actuators are arranged on the housing around the rotor.

7. The micro-actuator of claim 1, wherein the actuator comprises a first actuator, and further comprising a second actuator arranged on the housing, wherein the first and second actuators are arranged on opposite sides of the rotor.

8. The micro-actuator of claim 1, wherein the plurality of fins include a first set of fins that are arranged in a first orientation and a second set of fins that are arranged in a second orientation.

9. The micro-actuator of claim 8, wherein when the actuator contacts the first set of fins, the rotor moves in a first rotational direction, and wherein when the actuator contacts the second set of fins, the rotor moves in a second rotational direction.

10. The micro-actuator of claim 8, wherein the actuator comprises a first actuator, and further comprising a second actuator arranged on the housing, wherein the first and second actuators are arranged such that reciprocal movement of the first actuator causes the first actuator to contact the first set of fins, and wherein reciprocal movement of the second actuator causes the second actuator to contact the second set of fins.

11. The micro-actuator of claim 10, wherein reciprocal movement of the first actuator causes the rotor to rotate in a first rotational direction, and wherein reciprocal movement of the second actuator causes the rotor to rotate in a second rotational direction.

12. The micro-actuator of claim 1, wherein the actuator comprises at least one of a piezoelectric transducer, an electrostatic transducer, and a shape memory device.

13. The micro-actuator according to claim 1, wherein the rotor and the plurality of fins are integrally formed in a substrate using photolithographic or micromachining techniques.

14. The micro-actuator according to claim 13, wherein the actuator is also formed on the substrate using photolithographic or micromachining techniques.

15. The micro-actuator according to claim 13, wherein the substrate is formed of silicon.

16. A micro-actuator comprising:
    an elongated movable member;
    a plurality of fins, wherein inner portions of the plurality of fins are attached to the movable member; and
    an actuator positioned adjacent to a surface of the movable member and extending parallel to the surface, the actuator being adapted for reciprocal movement in a direction substantially perpendicular to the surface of the movable member, wherein reciprocal movement of the actuator brings the actuator into contact with at least one of the plurality of fins, and wherein said reciprocal movement causes the movable member to move.

17. The micro-actuator of claim 16, wherein the plurality of fins are elastically attached to the movable member, and wherein the reciprocal movement of the actuator causes fins which the actuator contacts to move with respect to the movable member.

18. The micro-actuator of claim 16, wherein the actuator contacts outer portions of the plurality of fins.

19. The micro-actuator of claim 16, wherein the plurality of fins are pivotally attached to the movable member.

20. The micro-actuator of claim 19, further comprising a plurality of biasing members, wherein each biasing member acts on a corresponding fin such that outer portions of the fins are biased away from the movable member.

21. The micro-actuator of claim 19, wherein the actuator comprises a first actuator, and further comprising a second actuator, wherein the first and second actuators are arranged around the movable member.

22. The micro-actuator of claim 16, wherein the actuator comprises at least one of a piezoelectric transducer, an electrostatic transducer, and a shape memory device.

23. The micro-actuator of claim 16, wherein the movable member is adapted to move along a track, and wherein the actuator is arranged on the track.

24. The micro-actuator of claim 16, wherein the plurality of fins include a first set of fins that are arranged in a first orientation and a second set of fins that are arranged in a second orientation.

25. The micro-actuator of claim 24, wherein when the actuator contacts the first set of fins, the movable member moves in a first direction, and wherein when the actuator contacts the second set of fins, the movable member moves in a second direction.

26. The micro-actuator of claim 24, wherein the actuator comprises a first actuator, and further comprising a second actuator, wherein the first actuator is arranged such that reciprocal movement of the first actuator causes the first actuator to contact the first set of fins, and wherein the second actuator is arranged such that reciprocal movement of the second actuator causes the second actuator to contact the second set of fins.

27. The micro-actuator of claim 26, wherein reciprocal movement of the first actuator causes the movable member to move in a first direction, and wherein reciprocal movement of the second actuator causes the movable member to move in a second direction.

28. The micro-actuator according to claim 16, wherein the movable member and the plurality of fins are integrally formed in a substrate using photolithographic or micromachining techniques.

29. The micro-actuator according to claim 28, wherein the actuator is also formed on the substrate using photolithographic or micromachining techniques.

30. The micro-actuator according to claim 28, wherein the substrate is formed of silicon.

31. A micro-actuator, comprising:
   a track;
   a plurality of fins elastically attached to the track, wherein outer portions of the fins extend towards a central portion of the track;
   a movable member adapted to move along the track; and
   an actuator mounted on the movable member and adapted for reciprocal movement, wherein reciprocal movement of the actuator brings the actuator into contact with at least one of the plurality of fins, and wherein said reciprocal movement causes the movable member to move along the track.

32. The micro-actuator of claim 31, wherein the plurality of fins are pivotally attached to the track.

33. The micro-actuator of claim 32, further comprising a plurality of biasing members, wherein each biasing member acts on a corresponding fin such that outer portions of the fins are biased towards the central portion of the track.

34. The micro-actuator of claim 31, wherein the actuator comprises a first actuator, and further comprising a second actuator.

35. The micro-actuator of claim 31, wherein the plurality of fins include a first set of fins that are arranged in a first orientation and a second set of fins that are arranged in a second orientation.

36. The micro-actuator of claim 35, wherein when the actuator contacts the first set of fins, the movable member moves in a first direction, and wherein when the actuator contacts the second set of fins, the movable member moves in a second direction.

37. The micro-actuator of claim 35, wherein the actuator comprises a first actuator, and further comprising a second actuator, wherein the first actuator is arranged such that reciprocal movement of the first actuator causes the first actuator to contact the first set of fins, and wherein the second actuator is arranged such that reciprocal movement of the second actuator causes the second actuator to contact the second set of fins.

38. The micro-actuator of claim 37, wherein reciprocal movement of the first actuator causes the movable member to move in a first direction, and wherein reciprocal movement of the second actuator causes the movable member to move in a second direction.

39. The micro-actuator according to claim 31, wherein the track and the plurality of fins are integrally formed in a substrate using photolithographic or micromachining techniques.

40. The micro-actuator according to claim 39, wherein the movable member and the actuator are also formed on the substrate using photolithographic or micromachining techniques.

41. The micro-actuator according to claim 39, wherein the substrate is formed of silicon.

* * * * *